(12) United States Patent
Kim et al.

(10) Patent No.: US 7,454,766 B2
(45) Date of Patent: Nov. 18, 2008

(54) STACK TYPE OPTICAL DISK CHANGER

(75) Inventors: Sang-Joe Kim, Seoul (KR); Dong-Kill Yu, Incheon (KR)

(73) Assignee: LG Electronics Inc., Seoul (KR)

( * ) Notice: Subject to any disclaimer, the term of this patent is extended or adjusted under 35 U.S.C. 154(b) by 587 days.

(21) Appl. No.: 10/984,477

(22) Filed: Nov. 8, 2004

(65) Prior Publication Data
US 2005/0144627 A1 Jun. 30, 2005

(30) Foreign Application Priority Data
Dec. 24, 2003 (KR) .................. 10-2003-0096855
Dec. 31, 2003 (KR) .................. 10-2003-0102243

(51) Int. Cl.
*G11B 17/03* (2006.01)
(52) U.S. Cl. ..................................... 720/614
(58) Field of Classification Search ................ 720/614, 720/725, 610; 360/97.01; 369/30.9
See application file for complete search history.

(56) References Cited

U.S. PATENT DOCUMENTS

| | | | |
|---|---|---|---|
| 4,965,685 A * | 10/1990 | Thompson et al. ....... 360/97.01 |
| 5,107,474 A | 4/1992 | Ishibashi et al. |
| 5,930,223 A | 7/1999 | Toyama et al. |
| 5,970,036 A * | 10/1999 | Matsugase .................. 720/614 |
| 6,272,093 B1 * | 8/2001 | Kurozuka et al. ........... 720/627 |
| 6,728,168 B2 * | 4/2004 | Kido ......................... 369/30.9 |
| 7,246,363 B2 * | 7/2007 | Morioka et al. ............. 720/614 |
| 2005/0144627 A1 * | 6/2005 | Kim et al. .................... 720/614 |
| 2006/0005217 A1 * | 1/2006 | Leonhardt et al. ........... 720/725 |

FOREIGN PATENT DOCUMENTS

| CN | 1175768 A | 3/1998 |
|---|---|---|
| EP | 0 492 965 A2 | 12/1991 |

\* cited by examiner

*Primary Examiner*—Tianjie Chen
(74) *Attorney, Agent, or Firm*—Lee, Hong, Degerman, Kang & Waimey

(57) ABSTRACT

The present invention discloses a stack type optical disk changer including a main frame, a cartridge slidably installed on the main frame, a plurality of disk trays slidably stacked in the cartridge, and a cartridge movement preventing means installed in the main frame, for selectively stopping movement of the cartridge. The stack type optical disk changer maintains quality of sound or image of an optical disk, and prevents damages of the optical disk, mis-operations and breakage, by preventing the optical disk from being separated from the tray.

17 Claims, 8 Drawing Sheets

STACK TYPE OPTICAL DISK CHANGER

CROSS-REFERENCE TO RELATED APPLICATIONS

Pursuant to 35 U.S.C. § 119(a), this application claims the benefit of earlier filing dates and right of priority to Korean Application Nos. 96855/2003, filed on Dec. 24, 2003 and 102243/2003, filed on Dec. 31, 2003, the contents of which are hereby incorporated by reference herein in their entirety.

BACKGROUND OF THE INVENTION

1. Field of the Invention

The present invention relates to a stack type optical disk changer, and more particularly to, a stack type optical disk changer which can prevent movement of a cartridge and each tray.

2. Description of the Background Art

In general, an optical disk changer charges a plurality of optical disks into each tray, so that the user can freely select and reproduce a target optical disk. The optical disk changer is classified into a rotary type optical disk changer and a stack type optical disk changer.

The stack type optical disk changer which can charge more optical disks than the rotary type optical disk changer has been recently popularly used.

FIG. 1 is a perspective view illustrating a conventional stack type optical disk changer, FIG. 2 is a plane view illustrating an operation of taking a cartridge out of a main frame in the conventional stack type optical disk changer, FIG. 3 is a plane view illustrating an operation of putting the cartridge into the main frame in the conventional stack type optical disk changer, and FIG. 4 is a front view illustrating the conventional stack type optical disk changer of FIG. 1.

Referring to FIGS. 1 to 4, in the conventional stack type optical disk changer 10, a cartridge 12 is installed to slide into or out of a main frame 11, and a plurality of trays 13a to 13e are sequentially slidably installed inside the cartridge 12.

An optical pick-up (not shown) is disposed at the inside rear portion of the main frame 11, and a tray loading unit 14 for loading one of the trays 13a to 13e selected by the user, for example, the tray 13c to the optical pick-up is disposed at the inside side portion of the main frame 11.

The tray loading unit 14 includes a plurality of tray loading gears 14b engaged with a cam 20 rotated by a driving unit 14a, for receiving power, and a tray loading lever 14c for loading the tray selected by the user, for example, the tray 13c to the optical pick-up by the tray loading gears 14b.

A cartridge loading unit 15 for loading the cartridge 12 to the main frame 11 or unloading the cartridge 12 from the main frame 11 is disposed at the inside front portion of the main frame 11.

A cartridge loading gear 15a of the cartridge loading unit 15 is engaged with a rack 12a formed on the inner circumferential surface of the cartridge 12. Therefore, the cartridge 12 is loaded to the main frame 11 or unloaded from the main frame 11 according to the rotation direction of the cartridge loading gear 15a.

In the conventional stack type optical disk changer 10, as shown in FIG. 2, when a driving unit 15b is driven in the forward direction to rotate the cartridge loading gear 15a in the anticlockwise direction, the cartridge 12 is slidably taken out of the main frame 11.

Conversely, as depicted in FIG. 3, when the driving unit 15b is driven in the backward direction to rotate the cartridge loading gear 15a in the clockwise direction, the cartridge 12 is slidably put into the main frame 11.

In the case that the cartridge 12 is put into the main frame 11, if the user selects an optical disk reproduction mode, the tray 13c selected by the user is loaded to the optical pick-up by the tray loading unit 14, and the optical pick-up reproduces an optical disk (not shown) positioned on the tray 13c.

However, the conventional stack type optical disk changer 10 does not have a special device for preventing movement of the cartridge 12 in the reproduction mode or replacement mode of the optical disk. If external shaking or impact generated by transportation or sudden braking of a vehicle is applied to the optical disk changer 10, the cartridge 12 moves (shakes), to reduce quality of sound or image of the optical disk.

In addition, as shown in FIG. 4, the optical disk positioned on the tray 13d is separated from the tray 13d and damaged due to an interval d formed between the tray 13b and the tray 13d directly after the tray 13c is loaded to the optical disk, and even the optical disk changer 10 is mistakenly operated or gets out of order.

SUMMARY OF THE INVENTION

Therefore, an object of the present invention is to provide a stack type optical disk changer which can maintain quality of sound or image of an optical disk by efficiently preventing a cartridge and each tray from moving due to external shaking or impact, and which can prevent damages of the optical disk, mis-operations and breakage, by preventing the optical disk from being separated from the tray.

To achieve these and other advantages and in accordance with the purpose of the present invention, as embodied and broadly described herein, there is provided a stack type optical disk changer, including: a main frame; a cartridge slidably installed on the main frame; a plurality of disk trays sequentially slidably installed in the cartridge; a cartridge movement preventing means installed in the main frame, for preventing movement of the cartridge; and tray movement preventing means installed at the lower portions of the trays, for preventing movement of the trays.

Preferably, the cartridge movement preventing means includes: a cam protrusion formed on a top surface of a cam; a rotary lever rotatably installed on the main frame and pressed by the cam protrusion, for locking the cartridge; and a spring installed at a hinge unit of the rotary lever.

Preferably, the hinge unit is protruded from both sides of the middle portion of the rotary lever, a contact protrusion corresponding to the cam protrusion is extended from the lower portion of one side end of the rotary lever, and a locking protrusion inserted into a locking groove formed on the cartridge is extended from the upper portion of the other side end of the rotary lever.

Preferably, a safe mounting member having a safe mounting groove is formed at one side of the main frame, so that the hinge unit of the rotary lever can be coupled thereto, and a hook and a support member are formed at a predetermined interval at the other side of the main frame corresponding to the safe mounting member.

Preferably, each of the tray movement preventing means includes a support lever rotatably installed on the hinge unit, and a torsion spring installed at a hinge unit of the support lever.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
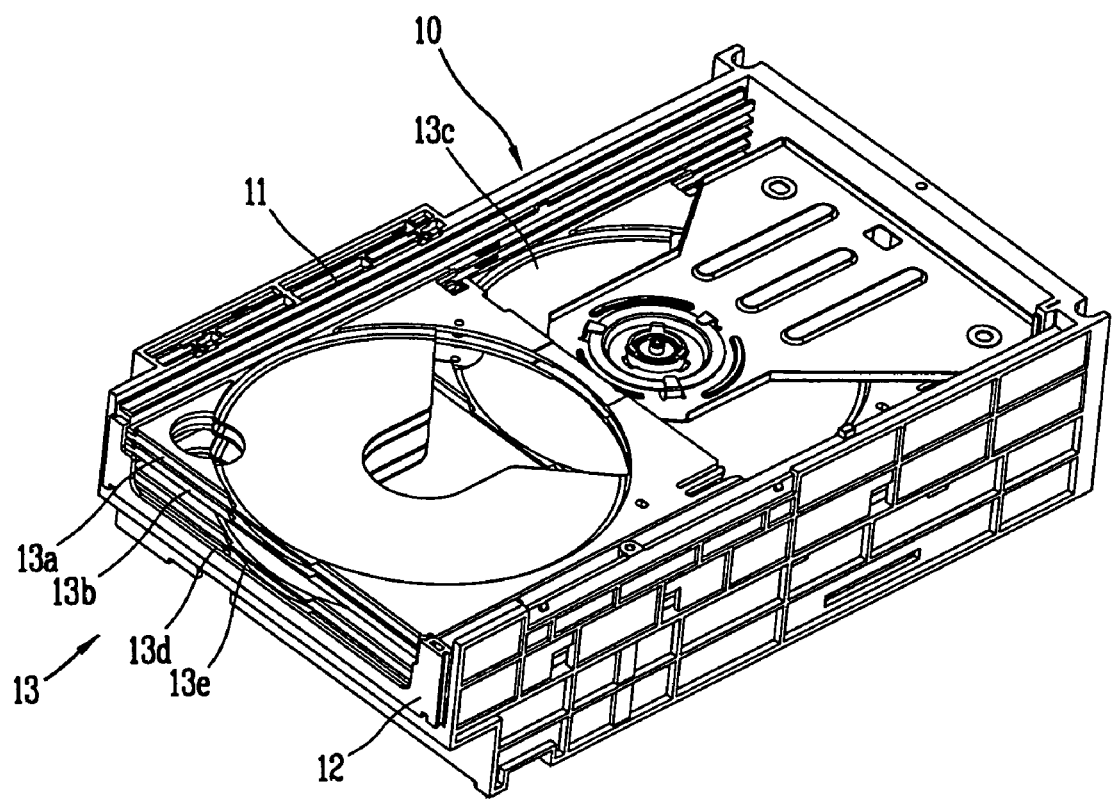
FIG. 1 is a perspective view illustrating a conventional stack type optical disk changer.
Figure 2:
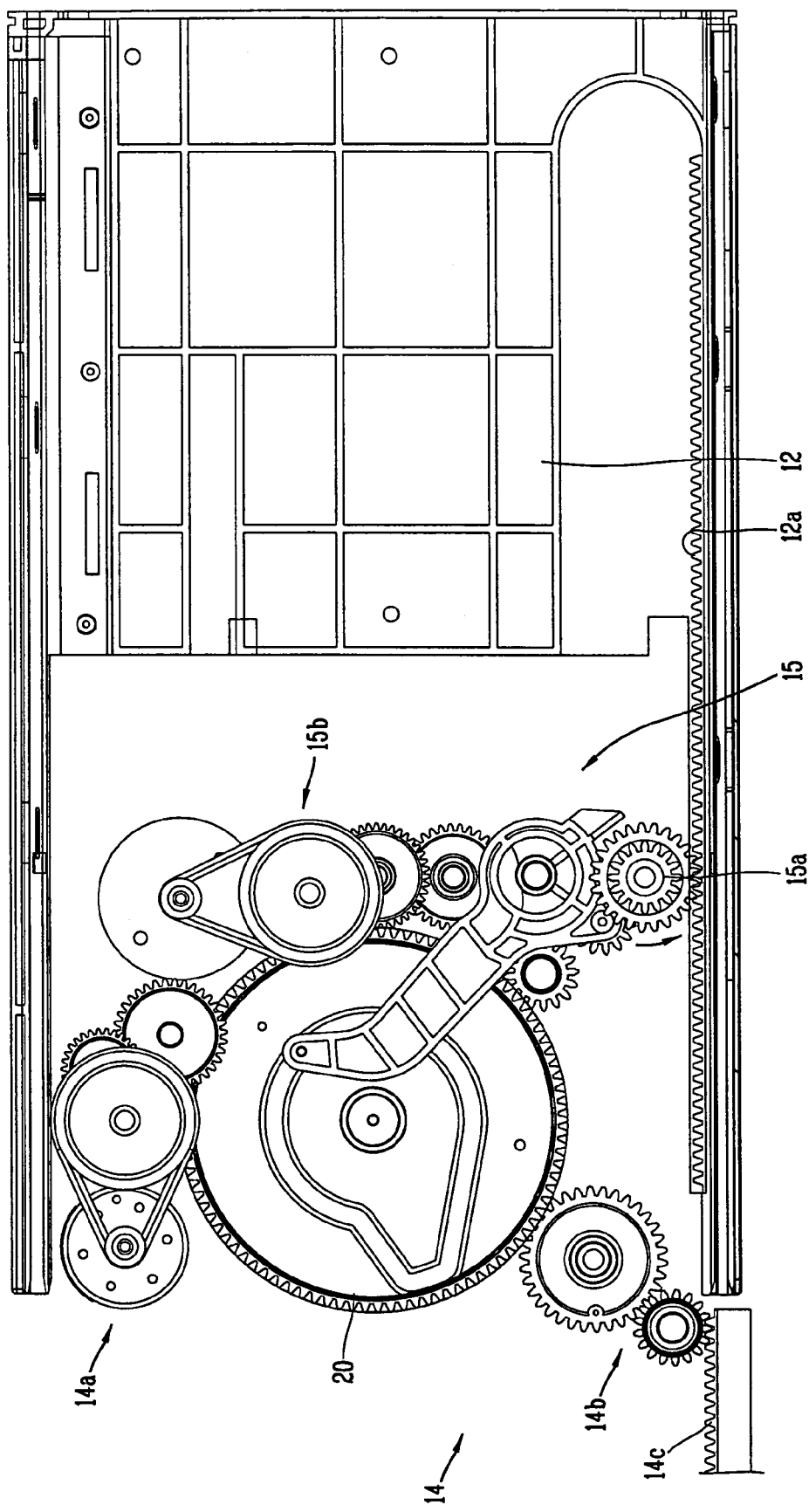
FIG. 2 is a plane view illustrating an operation of taking a cartridge out of a main frame in the conventional stack type optical disk changer.
Figure 3:
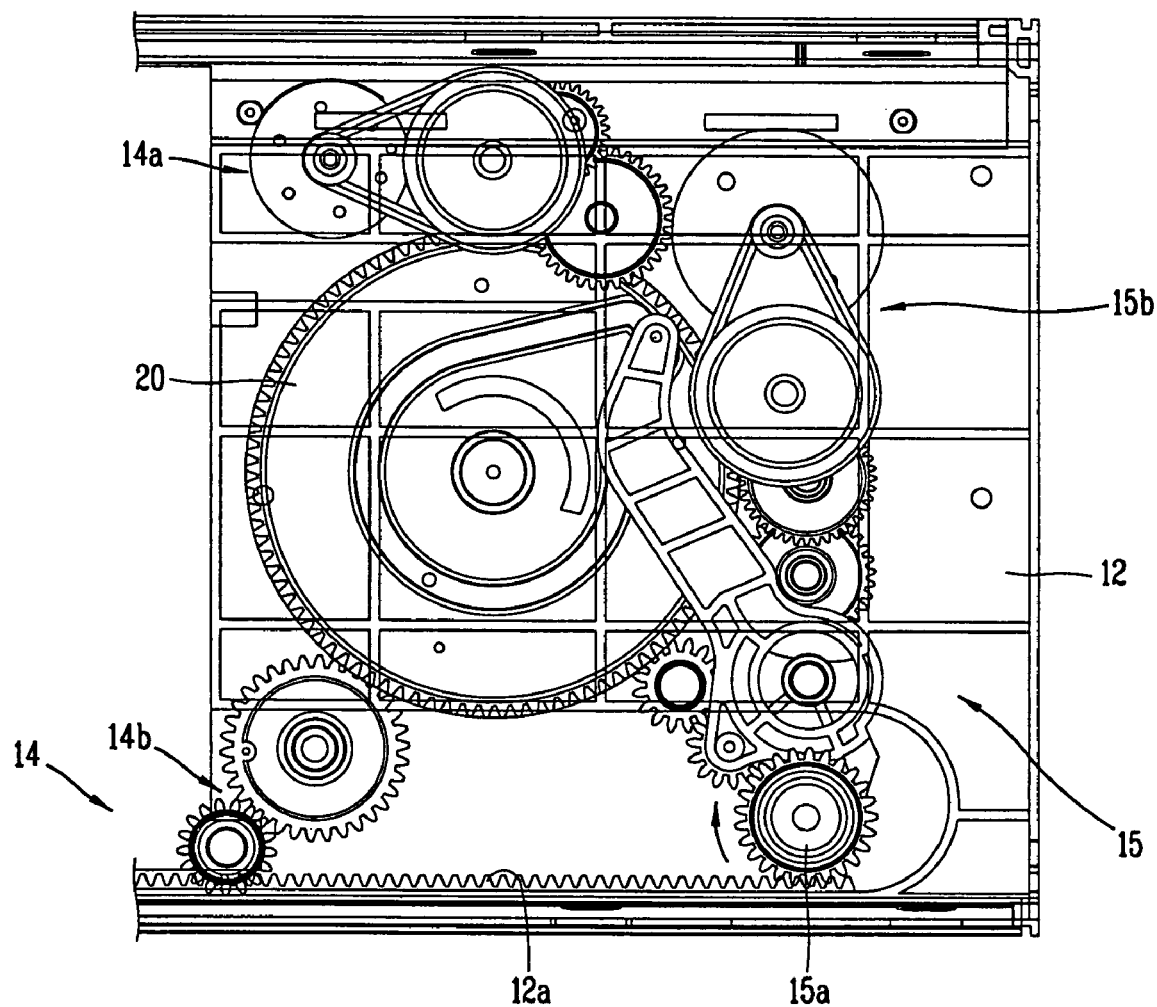
FIG. 3 is a plane view illustrating an operation of putting the cartridge into the main frame in the conventional stack type optical disk changer.

Reference will now be made in detail to the preferred embodiments of the present invention, examples of which are illustrated in the accompanying drawings.

Referring to FIGS. 5 to 10, in a stack type optical disk changer 100, a cartridge 120 is installed to slide into or out of a main frame 110, and a plurality of trays 130a to 130e are sequentially slidably installed inside the cartridge 120.

An optical pick-up (not shown) is disposed at the rear portion of the main frame 110, and a tray loading unit 140 for loading one of the trays 130a to 130e selected by the user, for example, the tray 130c to the optical pick-up is disposed at one inside portion of the main frame 110.

The tray loading unit 140 includes a plurality of tray loading gears 140b engaged with a cam 20 rotated by a driving unit 140a, for receiving power from the driving unit 140a, and a tray loading lever 140c for loading the tray 130c selected by the user to the optical pick-up by the tray loading gears 140b.

A cartridge loading unit 150 for loading the cartridge 120 to the main frame 110 or unloading the cartridge 120 from the main frame 110 is disposed at the other side of the main frame 110.

A cartridge loading gear 150a of the cartridge loading unit 150 is engaged with a rack 120a formed on the inner circumferential surface of the cartridge 120. Therefore, the cartridge 120 is loaded to the main frame 110 or unloaded from the main frame 110 according to the rotation direction of the cartridge loading gear 150a.

In accordance with the present invention, the stack type optical disk changer 100 includes a cartridge movement preventing means 200 in the main frame 110, for preventing movement of the cartridge 120.

As the cartridge movement preventing means 200, the cam 20 is installed to be rotated by the driving unit 140a, and a cam protrusion 201 is formed on the top surface of the cam 20.

A rotary lever 210 selectively locked on the cartridge 120 by the cam protrusion 201 is rotatably installed on the bottom surface 110a of the main frame 110. That is, the rotary lever 210 is rotatably coupled to the bottom surface 110a of the main frame 110, positioned between the main frame 110 and the cam 20, and rotated on a hinge unit 211 in the clockwise direction or anticlockwise direction.

The hinge unit 211 is protruded from both sides of the middle portion of the rotary lever 210. A contact protrusion 212 corresponding to the cam protrusion 201 is extended from the lower portion of one side end of the rotary lever 210, and a locking protrusion 213 inserted into a locking groove 221 formed on the bottom surface of the cartridge 120 is formed at the upper portion of the other side end of the rotary lever 210.

Figure 7:
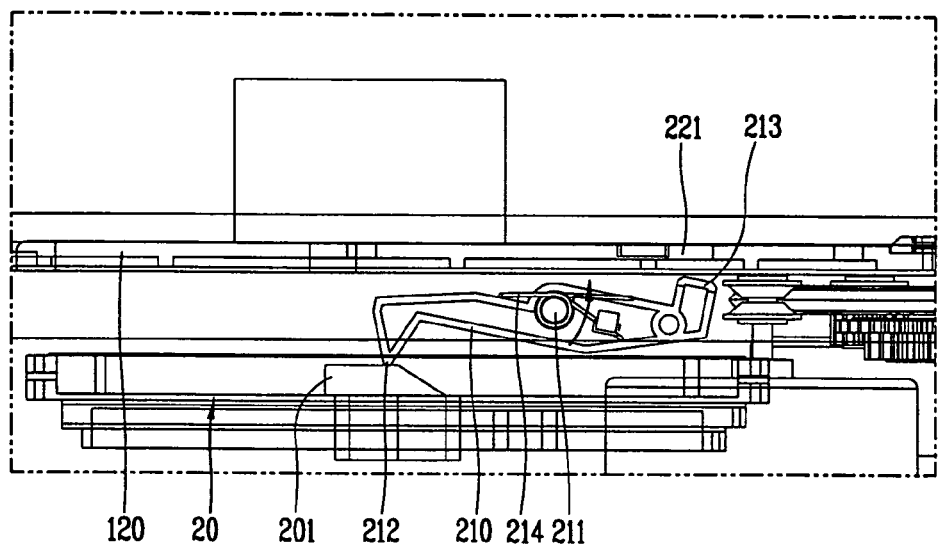
FIG. 7 is a vertical-sectional view illustrating a state where a rotary lever does not lock the cartridge in the stack type optical disk changer in accordance with the present invention.

A torsion spring 214 is fixedly inserted onto the hinge unit 211 of the rotary lever 210. As shown in FIG. 7, the torsion spring 214 applies a force in the direction of inserting the locking protrusion 213 into the locking groove 221, namely in the anticlockwise direction.

Figure 10:
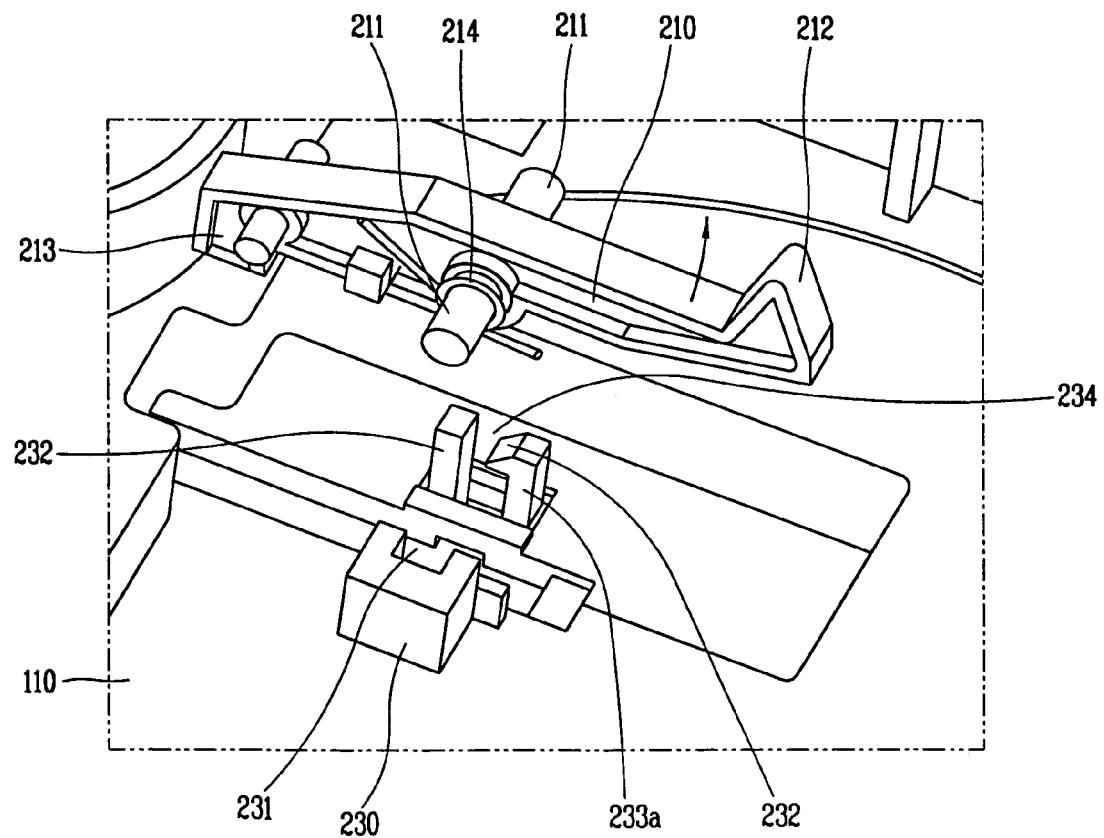
FIG. 10 is a perspective view illustrating the rotary lever coupled to the main frame in the stack type optical disk changer in accordance with the present invention.

In a structure of coupling the rotary lever 210 to the main frame 110, as depicted in FIG. 10, a safe mounting member 230 is incorporated with the main frame 110, so that one side hinge unit 211 of the rotary lever 210 can be coupled thereto. A safe positioning groove 231 is formed inside the safe positioning member 230.

A hook 232 and a support rod 233 are formed at a predetermined interval 234 in the position corresponding to the safe mounting member 230, so that the other side hinge unit 211 of the rotary lever 210 can be coupled thereto.

Figure 11:
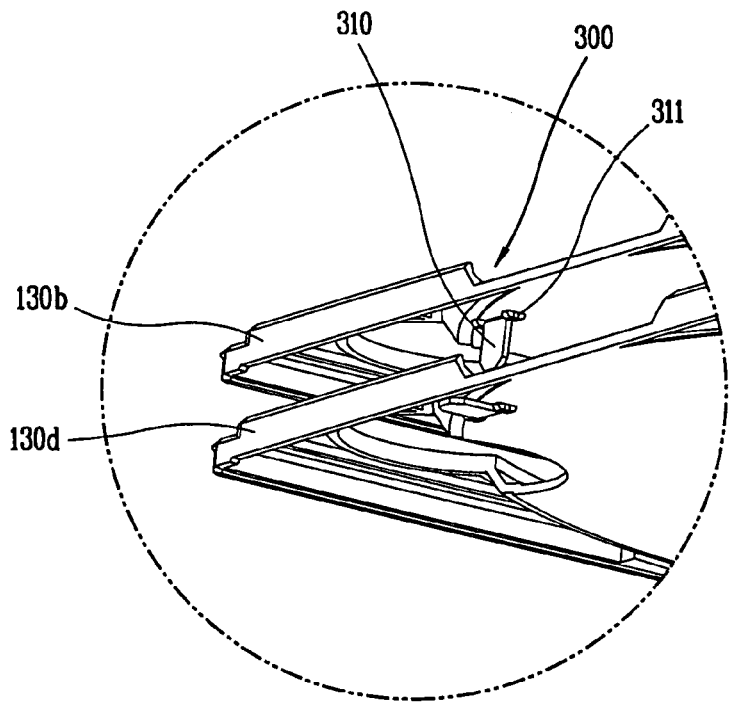
FIG. 11 is a bottom perspective view illustrating a tray movement preventing means in the stack type optical disk changer in accordance with the present invention.
Figure 12:
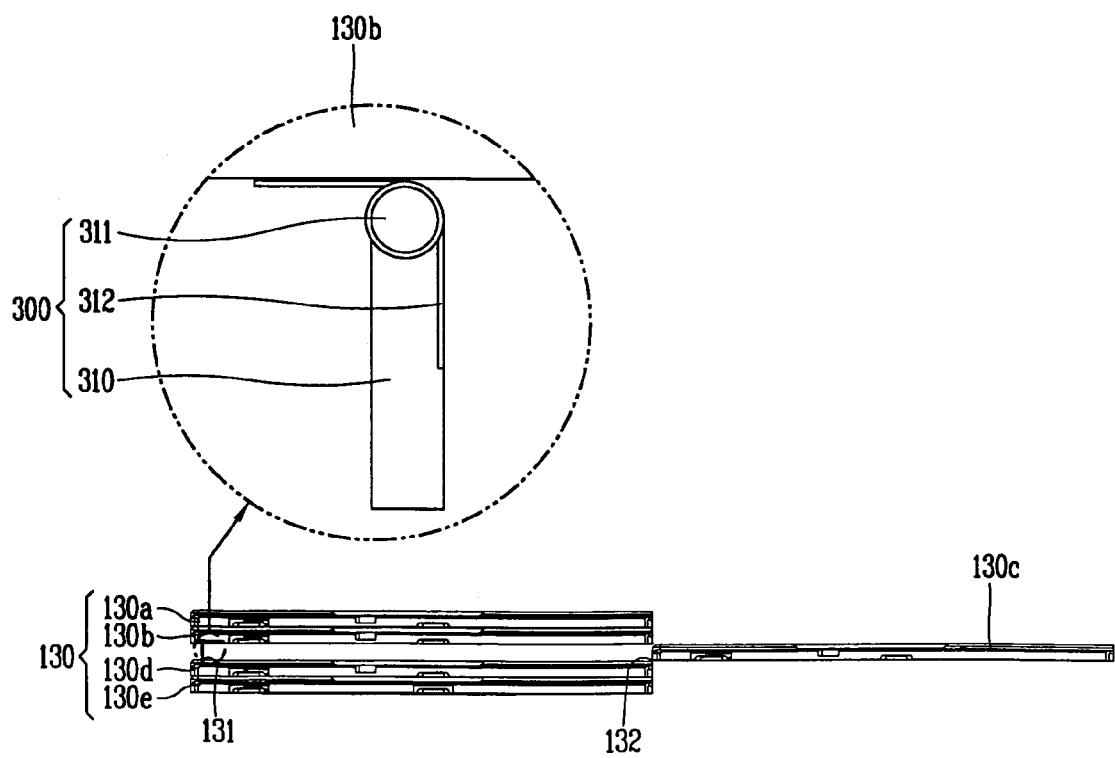
FIG. 12 is a side view illustrating an operation of the tray movement preventing means in the stack type optical disk changer in accordance with the present invention.

FIG. 11 is a bottom perspective view illustrating a tray movement preventing means in the stack type optical disk changer in accordance with the present invention, and FIG. 12 is a side view illustrating an operation of the tray movement preventing means in the stack type optical disk changer in accordance with the present invention.

As illustrated in FIGS. 11 and 12, the stack type optical disk changer 100 includes tray movement preventing means 300 for preventing movement of each of the first to third trays 130a to 130c at the lower portions of the first to third trays 130a to 130c among the plurality of first to fifth trays 130a to 130e.

The tray movement preventing means 300 are respectively installed at the lower portions of the first to third trays 130a to 130c, but need not to be installed at the lower portions of the fourth and fifth trays 130d and 130e.

For convenience' sake, the tray movement preventing means 300 installed at the lower portion of the second tray 130b is illustrated and explained below.

The tray movement preventing means 300 includes a support lever 310 rotatably installed on a hinge unit 311, and a torsion spring 312 installed at a hinge unit 311 of the support lever 310.

That is, the support lever 310 is folded by the tray 130c positioned directly below the support lever 310, and unfolded by an elastic force of the torsion spring 312 when the tray 130c is loaded. Here, the end of the unfolded support lever 310 supports the front surface 131 of the tray 130d, and the loaded tray 130c supports the rear surface 132 of the tray 130d at the same time. Therefore, the front surface 131 and the rear surface 132, namely both surfaces of the tray 130d are firmly supported, so that an optical disk (not shown) positioned on the tray 130d can be protected without being separated by external shaking or impact.

The operation of the stack type optical disk changer in accordance with the present invention will now be explained.

Figure 6:
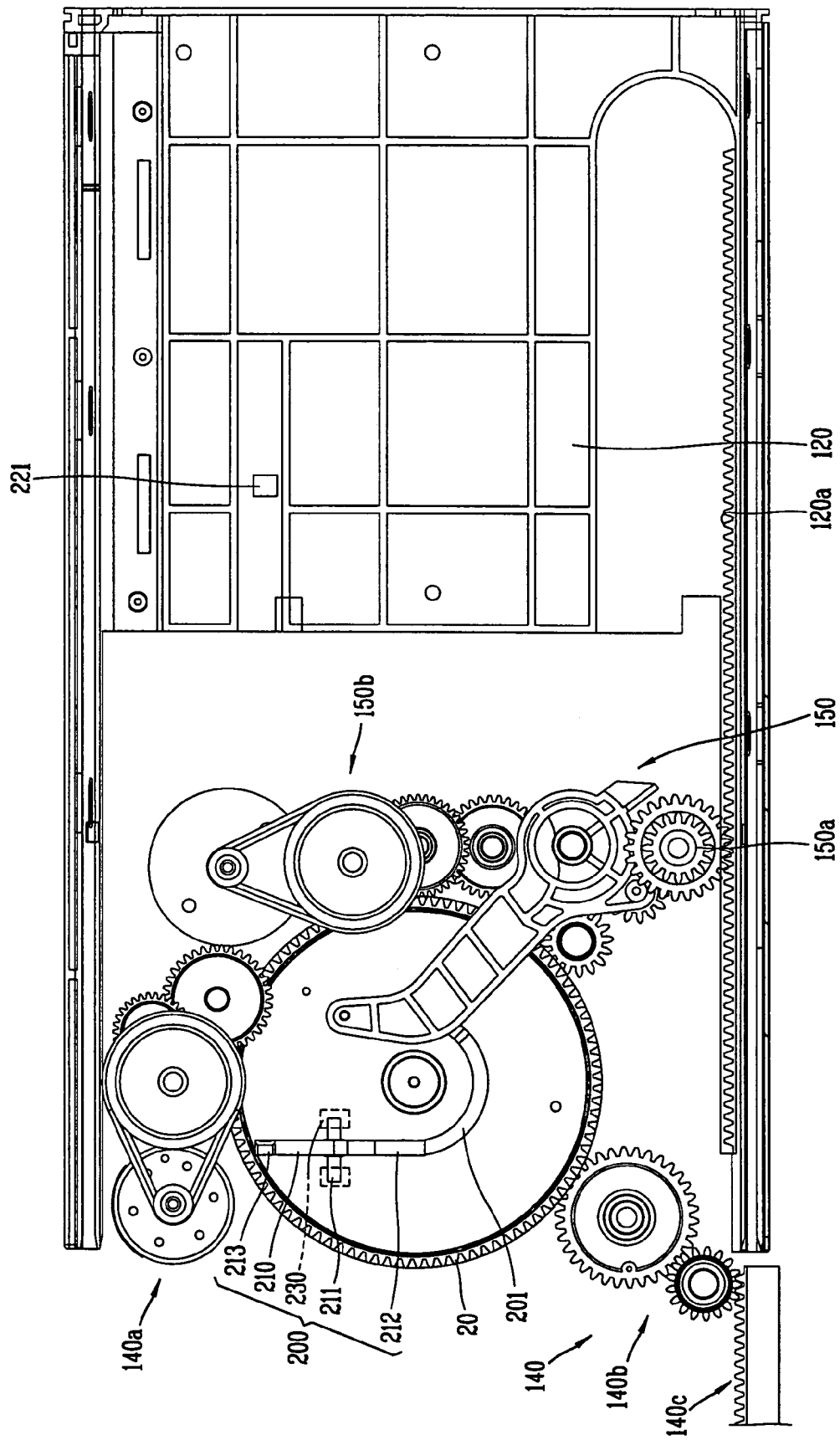
FIG. 6 is a plane view illustrating an operation of taking a cartridge out of a main frame in the stack type optical disk changer in accordance with the present invention.

Referring to FIG. 6, power of a driving unit 150b is applied to the cartridge loading gear 150a of the cartridge loading unit 150.

Here, when the cartridge loading gear 150a is rotated in the anticlockwise direction, the cartridge 120 is slidably taken out of the main frame 110.

Figure 8:
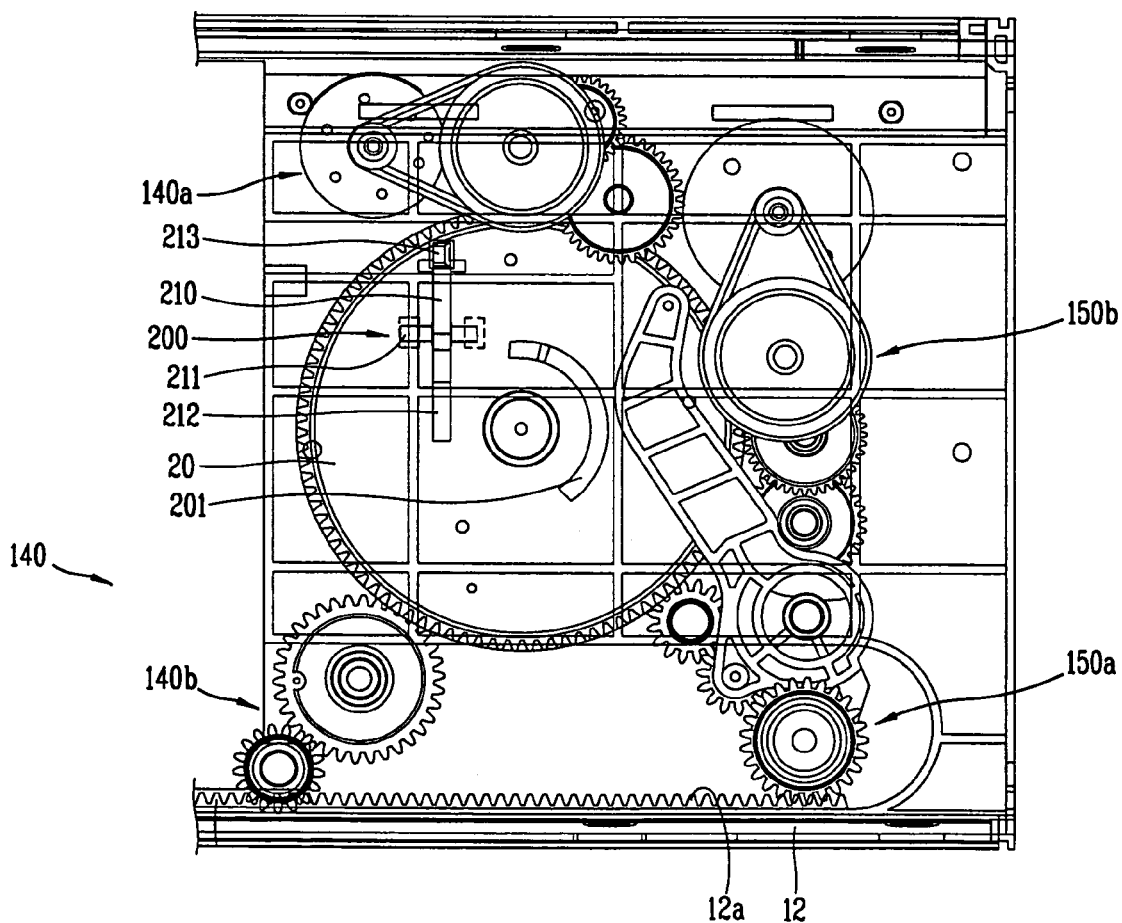
FIG. 8 is a plane view illustrating an operation of putting the cartridge into the main frame in the stack type optical disk changer in accordance with the present invention.

Conversely, as shown in FIG. 8, when the cartridge loading gear 150a is rotated in the clockwise direction, the cartridge 120 is slidably put into the main frame 110.

In a state where the cartridge 120 is put into the main frame 110, if the user selects an optical disk reproduction mode, the cam 20 is rotated by the driving unit 140a, the tray loading gears 140b engaged with the cam 20 are operated by rotation of the cam 20, and the loading lever 140c loads the specific tray, for example, the tray 130c to the optical pick-up. The optical disk of the loaded tray 130c is reproduced by the optical pick-up.

In accordance with the present invention, in order to prevent the cartridge 120 housed in the main frame 110 from moving in the reproduction mode or replacement mode of the optical disk, the stack type optical disk changer 100 is operated as follows.

As depicted in FIGS. 6 and 7, after the cartridge 120 is taken out of the main frame 110 or before the tray 130c is loaded, since the cam protrusion 201 overcomes the elastic force of the torsion spring 214 and upwardly presses and contacts the contact protrusion 212 of the rotary lever 210, the locking protrusion 213 of the rotary lever 210 downwardly sags.

Figure 9:
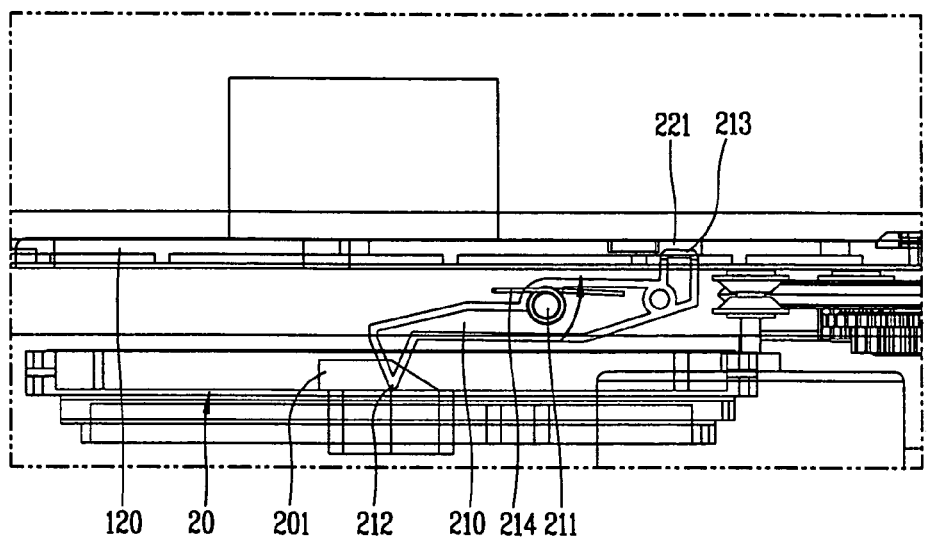
FIG. 9 is a vertical-sectional view illustrating a state where a rotary lever locks the cartridge in the stack type optical disk changer in accordance with the present invention.

Conversely, as shown in FIGS. 8 and 9, after the tray 130c is loaded, the cam protrusion 201 does not press and contact the contact protrusion 212 of the rotary lever 210 by rotation of the cam 20. Accordingly, the rotary lever 210 is rotated in the anticlockwise direction due to the elastic force of the torsion spring 214 in FIG. 9, and thus the locking protrusion 213 of the rotary lever 210 is inserted into the locking groove 221, thereby efficiently preventing movement of the cartridge 120.

That is, the cam 20 is rotated by the driving unit 140a, and the tray loading means 140 is operated by rotation of the cam 20, for transferring one 130c of the trays 130a to 130e of the cartridge 120 to the optical pick-up. Before the tray 130c is loaded, the cam protrusion 201 formed on the top surface of the cam 20 does not contact the contact protrusion 212. Here, the rotary lever 210 elastically installed by the torsion spring 214 is rotated on the hinge unit 211, and the locking protrusion 213 of the rotary lever 210 is elastically inserted into the locking groove 221 of the cartridge 120. As a result, the cartridge 120 does not shake in spite of external impact or shaking.

Furthermore, the tray movement preventing means 300 for preventing movement of the first to third trays 130a to 130c are disposed at the lower portions of the first to third trays 130a to 130c among the plurality of trays 130a to 130e. Directly after the specific tray 130c is loaded, the support lever 310 of the tray 130b elastically pressed by the tray 130c is rotated on the hinge unit 311 due to the elastic force of the torsion spring 214, for elastically supporting the front surface 131 of the tray 130d. In addition, the loaded tray 130c supports the rear surface 132 of the tray 130d. Accordingly, the front surface 131 of the tray 130d is supported by the support lever 310, and the rear surface 132 of the tray 130d is supported by the tray 130c.

Figure 4:
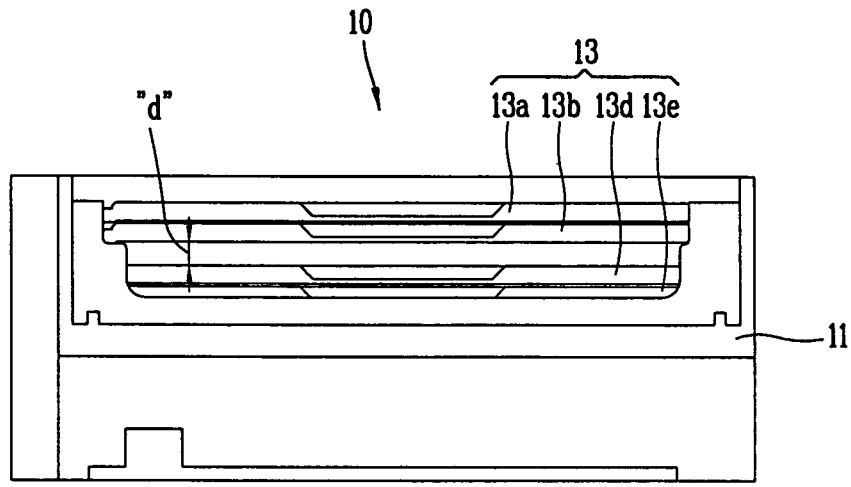
FIG. 4 is a front view illustrating the conventional stack type optical disk changer of FIG. 1.
Figure 5:
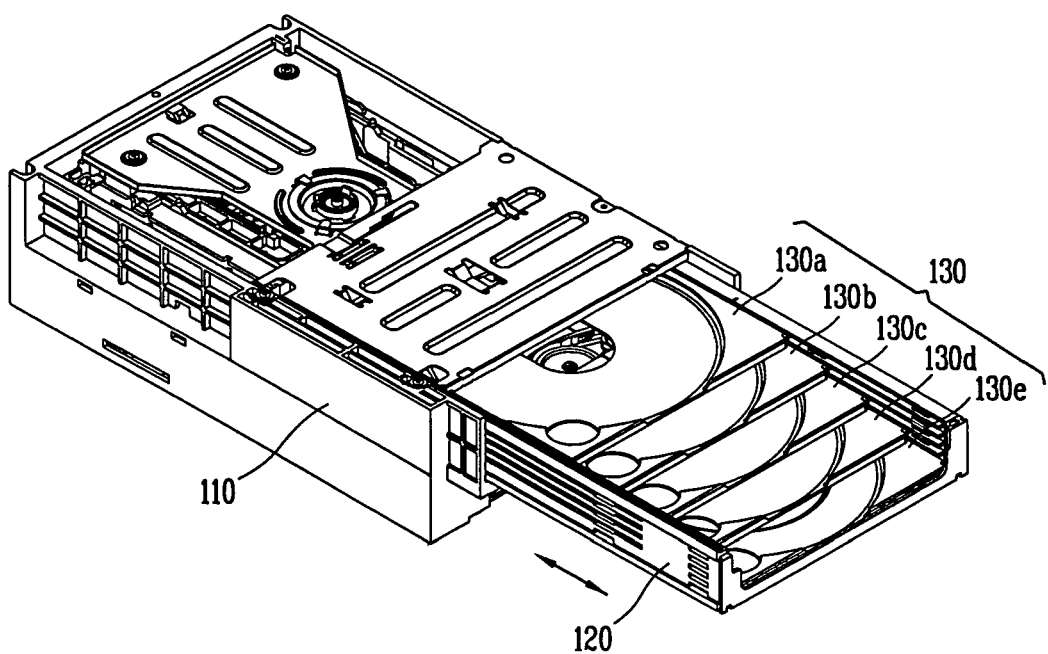
FIG. 5 is a perspective view illustrating a stack type optical disk changer in accordance with the present invention.

Since the both surfaces 131 and 132 of the tray 130d are supported by the support lever 310 and the loaded tray 130c, respectively, even if an interval (d: refer to FIG. 4) is formed in the loading operation of the tray 130c, the optical disk is not separated from the tray 130d by shaking or impact.

On the other hand, in order to release the reproduction mode of the optical disk, the aforementioned operations are performed in a reverse order. That is, the cam 20 is rotated in the backward direction by backward driving of the driving unit 140a, and the tray loading gears 140b are operated by backward rotation of the cam 20, for unloading the specific tray 130c.

Directly before the tray 130c is unloaded, the cam protrusion 201 of the cam 20 re-presses and contacts the contact protrusion 212, and the rotary lever 210 is rotated on the hinge unit 211. Here, the locking protrusion 213 of the rotary lever 210 is disconnected from the locking groove 212 of the cartridge 120, so that the cartridge 120 can be taken out of the main frame 110 by the cartridge loading means 150.

As discussed earlier, in accordance with the present invention, the stack type optical disk changer can maintain quality of sound or image of the optical disk by efficiently preventing the cartridge and each tray from moving due to external shaking or impact, and which can prevent damages of the optical disk, mis-operations and breakage, by preventing the optical disk from being separated from the tray.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stack type optical disk changer, comprising:
a main frame;
a cartridge slidably installed on the main frame;
a plurality of disk trays sequentially slidably installed in the cartridge; and a cartridge movement preventing means installed in the main frame, for preventing movement of the cartridge,
wherein the cartridge movement preventing means comprises:
a cam protrusion formed on a top surface of a cam;
a rotary lever rotatably installed on the main frame and pressed by the cam protrusion, for locking the cartridge; and
a spring inserted onto a hinge unit of the rotary lever.

2. The stack type optical disk changer of claim 1, wherein the hinge unit is protruded from both sides of a middle portion of the rotary lever, a contact protrusion corresponding to the cam protrusion is extended from a lower portion of a first side end of the rotary lever, and a locking protrusion inserted into a locking groove formed on a bottom surface of the cartridge is extended from an upper portion of a second side end of the rotary lever.

3. The stack type optical disk changer of claim 2, wherein a safe mounting member having a safe mounting groove is formed at a first side of the main frame, such that the hinge unit of the rotary lever can be coupled thereto, and a hook and a support member are formed at a predetermined interval at a second side of the main frame corresponding to the safe mounting member.

4. The stack type optical disk changer of claim 1, further comprising:
   tray movement preventing means installed at lower portions of the plurality of disk trays, for preventing movement of the disk trays.

5. The stack type optical disk changer of claim 4, wherein the tray movement preventing means comprises:
   a support lever rotatably installed on a hinge unit; and
   a spring installed at the hinge unit of the support lever.

6. The stack type optical disk changer of claim 5, wherein the spring is a torsion spring.

7. A stack type optical disk changer, comprising:
   a cartridge slidably installed on a main frame;
   a plurality of optical disk trays sequentially slidably installed in the cartridge; and tray movement preventing means installed at lower portions of the plurality of optical disk trays, for preventing movement of the disk trays,
   wherein the tray movement preventing means comprises:
   a support lever rotatably installed on a hinge unit; and
   a spring installed at the hinge unit of the support lever.

8. The stack type optical disk changer of claim 7, further comprising:
   cartridge movement preventing means for preventing movement of the cartridge.

9. A stack type optical disk changer, comprising:
   a main frame;
   a cartridge slidably installed on the main frame;
   a plurality of disk trays slidably stacked in the cartridge;
   cartridge movement preventing means installed in the main frame, for preventing movement of the cartridge; and
   tray movement preventing means installed at lower portions of the plurality of disk trays, for preventing movement of the disk trays.

10. The stack type optical disk changer of claim 9, wherein the cartridge movement preventing means comprises:
    a cam protrusion formed on a top surface of a cam;
    a rotary lever rotatably installed on the main frame and pressed by the cam protrusion, for locking the cartridge; and
    a spring inserted onto a hinge unit of the rotary lever.

11. The stack type optical disk changer of claim 10, wherein the hinge unit is protruded from both sides of a middle portion of the rotary lever, a contact protrusion corresponding to the cam protrusion is extended from a lower portion of a first side end of the rotary lever, and a locking protrusion inserted into a locking groove formed on a bottom surface of the cartridge is extended from an upper portion of a second side end of the rotary lever.

12. The stack type optical disk changer of claim 11, wherein a safe mounting member having a safe mounting groove is formed at one side of a top surface of the cam, such that the hinge unit of the rotary lever can be coupled thereto, and a hook and a support member are formed at a predetermined interval in a position corresponding to the safe mounting member.

13. The stack type optical disk changer of claim 9, wherein the tray movement preventing means comprises:
    a support lever rotatably installed on a hinge unit; and
    a spring installed at the hinge unit of the support lever.

14. A stack type optical disk changer in which a cartridge is put into or taken out of a main frame and a plurality of trays are sequentially installed in a cartridge, the optical disk changer comprising:
    cartridge movement preventing means for preventing movement of the cartridge; and
    tray movement preventing means for preventing movement of the trays,
    wherein the cartridge movement preventing means comprises:
    a cam protrusion formed on a top surface of a cam;
    a rotary lever rotatably installed on the main frame and pressed by the cam protrusion, for locking the cartridge; and
    a spring inserted onto a hinge unit of the rotary lever.

15. The stack type optical disk changer of claim 14, wherein the hinge unit is protruded from both sides of a middle portion of the rotary lever, a contact protrusion corresponding to the cam protrusion is extended from a lower portion of a first side end of the rotary lever, and a locking protrusion inserted into a locking groove formed on a bottom surface of the cartridge is extended from an upper portion of a second side end of the rotary lever.

16. The stack type optical disk changer of claim 14, wherein a safe mounting member having a safe mounting groove is formed at one side of the top surface of the cam, so that the hinge unit of the rotary lever can be coupled thereto, and a hook and a support member are formed at a predetermined interval in the position corresponding to the safe mounting member.

17. The stack type optical disk changer of claim 14, wherein the tray movement preventing means comprises:
    a support lever rotatably installed on a hinge unit; and
    a spring installed at the hinge unit of the support lever.

* * * * *